(12) United States Patent
Kawashima et al.

(10) Patent No.: US 12,459,543 B2
(45) Date of Patent: Nov. 4, 2025

(54) VEHICLE CONTROL DEVICE, STORAGE MEDIUM FOR STORING COMPUTER PROGRAM FOR VEHICLE CONTROL, AND METHOD FOR CONTROLLING VEHICLE

(71) Applicant: TOYOTA JIDOSHA KABUSHIKI KAISHA, Toyota (JP)

(72) Inventors: Wataru Kawashima, Nisshin (JP); Ryosuke Hata, Arakawa-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 157 days.

(21) Appl. No.: 18/375,611

(22) Filed: Oct. 2, 2023

(65) Prior Publication Data

US 2024/0132116 A1 Apr. 25, 2024
US 2024/0227867 A9 Jul. 11, 2024

(30) Foreign Application Priority Data

Oct. 20, 2022 (JP) ................. 2022-168253

(51) Int. Cl.
*B60W 60/00* (2020.01)
*B60W 40/02* (2006.01)
*B60W 50/14* (2020.01)

(52) U.S. Cl.
CPC ........ *B60W 60/0057* (2020.02); *B60W 40/02* (2013.01); *B60W 50/14* (2013.01); *B60W 2050/146* (2013.01); *B60W 2420/54* (2013.01); *B60W 2555/20* (2020.02); *B60W 2556/20* (2020.02)

(58) Field of Classification Search
CPC .. B60W 60/0057; B60W 40/02; B60W 50/14; B60W 2556/20; B60W 2555/20; B60W 2050/146; B60W 2420/54; G08G 1/00; B60Q 9/00
USPC ......................................................... 701/23
See application file for complete search history.

(56) References Cited

U.S. PATENT DOCUMENTS

2005/0218723 A1 * 10/2005 Yamazaki .............. B60Q 1/143
307/10.1
2006/0055354 A1 * 3/2006 Hirose .................. B60S 1/0896
318/483

(Continued)

FOREIGN PATENT DOCUMENTS

EP 3424791 A1 * 1/2019 ............... B60Q 9/00
JP 2006-044318 A 2/2006

(Continued)

*Primary Examiner* — Tuan C To
(74) *Attorney, Agent, or Firm* — Dinsmore & Shohl LLP

(57) ABSTRACT

A vehicle control device has a processor configured to estimate an amount of rainfall per unit time based on an acoustic signal acquired by an acoustical sensor mounted on a vehicle, determine whether a present operation mode of the vehicle is a first operation mode with a lower level to which a driver is contributing to driving or a second operation mode with a higher level to which the driver is contributing to driving than the first operation mode, and decide a first time until the operation mode of the vehicle is transferred from the first operation mode to the second operation mode based on the amount of rainfall, when the operation mode of the vehicle is the first operation mode.

6 Claims, 5 Drawing Sheets

(56) References Cited

U.S. PATENT DOCUMENTS

| | | | |
|---|---|---|---|
| 2010/0295450 A1* | 11/2010 | Oishi | B60Q 1/143 |
| | | | 315/77 |
| 2017/0315551 A1* | 11/2017 | Mimura | B60W 30/143 |
| 2018/0059662 A1 | 3/2018 | Sato et al. | |
| 2018/0275652 A1 | 9/2018 | Kuwahara et al. | |
| 2019/0361100 A1* | 11/2019 | Abari | G01S 17/42 |
| 2023/0017970 A1* | 1/2023 | Oba | G01C 21/3626 |
| 2024/0046779 A1 | 2/2024 | Sugawara et al. | |

FOREIGN PATENT DOCUMENTS

| | | |
|---|---|---|
| JP | 2017-182558 A | 10/2017 |
| JP | 2018-030531 A | 3/2018 |
| JP | 2018-149873 A | 9/2018 |
| JP | 2019-018852 A | 2/2019 |
| JP | 2019-167116 A | 10/2019 |
| WO | 2022/201446 A1 | 9/2022 |

* cited by examiner

VEHICLE CONTROL DEVICE, STORAGE MEDIUM FOR STORING COMPUTER PROGRAM FOR VEHICLE CONTROL, AND METHOD FOR CONTROLLING VEHICLE

CROSS-REFERENCE TO RELATED APPLICATION

This application claims priority to Japanese Patent Application No. 2022-168253 filed on Oct. 20, 2022, the entire contents of which are herein incorporated by reference.

FIELD

The present disclosure relates to a vehicle control device, a storage medium for storing computer program for vehicle control, and a vehicle control method.

BACKGROUND

An automatic control system mounted on a vehicle, for example, has an automatic operation mode in which the vehicle is driven primarily by the automatic control system, and a manual operation mode in which the vehicle is driven primarily by the driver (for example, see Japanese Unexamined Patent Publication JP 2019-167116).

In the automatic operation mode, some or all of the driving operations required for the driving of the vehicle are executed automatically, so that the level to which the driver is contributing to driving is lower. On the other hand, in manual operation mode, the level to which the driver is contributing to driving is higher because the types of operation executed automatically are less than the automatic operation mode or zero.

In the automatic operation mode, the automatic control system generates driving plans of the vehicle while detecting the surrounding environment of the vehicle using sensors such as an image sensor or a LiDAR sensor mounted on the vehicle.

SUMMARY

When it rains, the raindrops adhere to the sensor, and the reliability of the sensor may gradually decreases. When the reliability of the sensor decreases, the automatic control system determines that the vehicle cannot be operated safely, and transfers the operation of the vehicle from the automatic operation mode to the manual operation mode.

If the operation of the vehicle is to be transferred from the automatic operation mode to the manual operation mode, the automatic control system notifies the driver of the control transfer request. The control transfer request asks the driver to transfer the operation of the vehicle from the automatic operation mode to the manual operation mode. The driver begins to drive the vehicle after performing an approval operation to approve the control transfer request.

If the reliability of the sensor decreases due to the rain, the automatic control system transfers the operation of the vehicle from the automatic operation mode to the manual operation mode. Here, the time for performing the predetermined operation by the driver is required until the transfer is completed.

The vehicle is in a state in which the reliability of the sensor is lowered until the transfer is completed. Thus, until the transfer is completed, there is a possibility that the driving plan generated by the automatic control system becomes unstable.

It is an object of the present disclosure to provide a vehicle control device that is capable of transferring the operation mode of the vehicle to a higher level to which the driver is contributing to driving before the reliability of the sensor decreases by the rain.

(1) According to one embodiment, a vehicle control device is provided. The vehicle control device has a processor configured to estimate an amount of rainfall per unit time based on an acoustic signal acquired by an acoustical sensor mounted on a vehicle, determine whether a present operation mode of the vehicle is a first operation mode with a lower level to which a driver is contributing to driving or a second operation mode with a higher level to which the driver is contributing to driving than the first operation mode, and decide a first time until the operation mode of the vehicle is transferred from the first operation mode to the second operation mode based on the amount of rainfall, when the operation mode of the vehicle is the first operation mode.

(2) In the vehicle control device of (1), the processor is further configured to calculate a second time until reliability of detecting an environment around the vehicle by other sensor detecting the environment around the vehicle becomes less than or equal to a predetermined reference reliability based on the amount of rainfall, and decide first time to be shorter than the second time.

(3) In the vehicle control device of (2), the processor is further configured to calculate the second time based on the amount of rainfall and speed of the vehicle.

(4) In the vehicle control device of (2), the processor is further configured to calculate the second time based on the amount of rainfall and a direction of the other sensor.

(5) In anyone of the vehicle control device of (2) to (4), the processor is further configured to decide the first time so that at least time required for the driver to approve a transfer of the operation mode of the vehicle from the first operation mode to the second operation mode is shorter than the second time.

(6) In anyone of the vehicle control device of (1) to (5), the processor is further configured to notify the driver via a notification unit that it is planned to transfer the operation mode of the vehicle from the first operation mode to the second operation mode after the first time has elapsed.

(7) According to another embodiment, a non-transitory storage medium storing a computer program for vehicle control is provided. The computer program for vehicle control causes a processor execute a process and the process includes estimating an amount of rainfall per unit time based on an acoustic signal acquired by an acoustical sensor mounted on a vehicle, determining whether a present operation mode of the vehicle is a first operation mode with a lower level to which a driver is contributing to driving or a second operation mode with a higher level to which the driver is contributing to driving than the first operation mode, and deciding a first time until the operation mode of the vehicle is transferred from the first operation mode to the second operation mode based on the amount of rainfall, when the operation mode of the vehicle is the first operation mode.

(8) Yet another embodiment of the present disclosure provides a method for controlling a vehicle that is carried out by a vehicle control device. The method for controlling a vehicle includes estimating an amount of rainfall per unit time based on an acoustic signal acquired by an acoustical sensor mounted on a vehicle, determining whether a present operation mode of the vehicle is a first operation mode with a lower level to which a driver is contributing to driving or a second operation mode with a higher level to which the driver is contributing to driving than the first operation mode, and deciding a first time until the operation mode of the vehicle is transferred from the first operation mode to the second operation mode based on the amount of rainfall, when the operation mode of the vehicle is the first operation mode.

The vehicle control device of the present disclosure can transfer the operation mode of the vehicle to a higher level to which the driver is contributing to driving before the reliability of the sensor decreases by the rain.

The object and aspects of the present disclosure will be realized and attained by the elements and combinations particularly pointed out in the claims. It is to be understood that both the foregoing general description and the following detailed description are exemplary and explanatory, and are not restrictive of the present disclosure, as claimed

DESCRIPTION OF EMBODIMENTS

Figure 1:
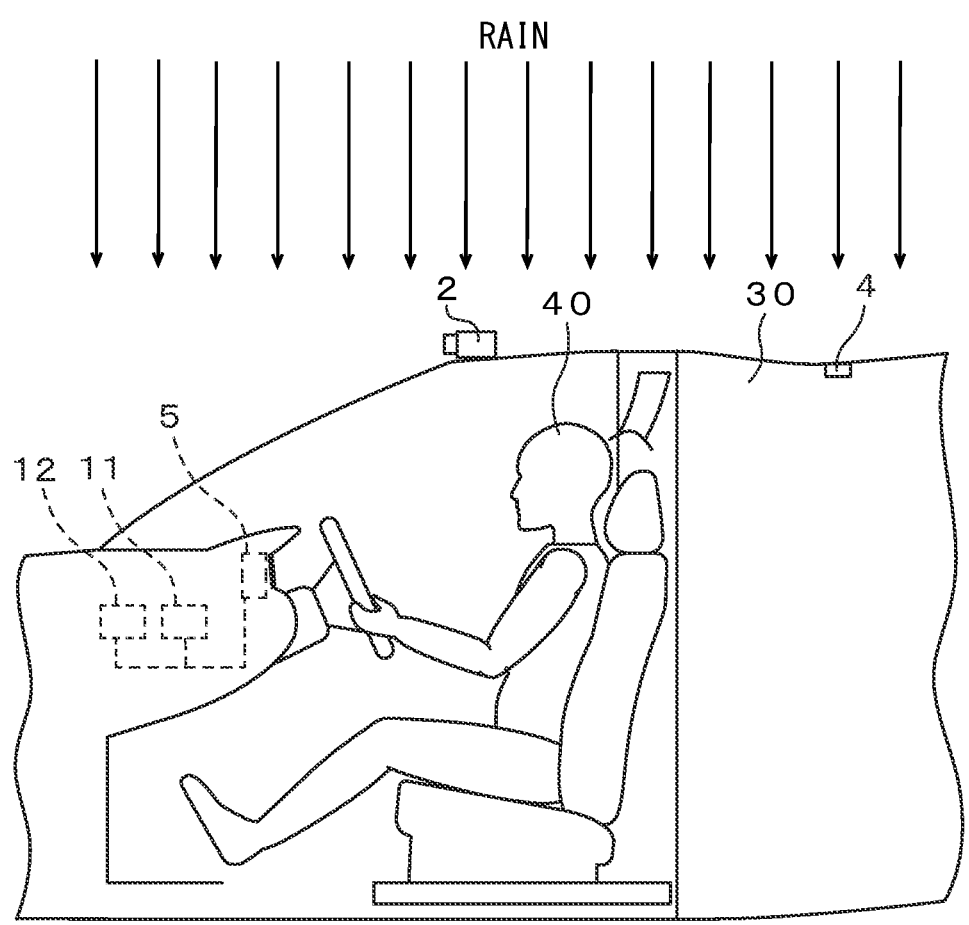
FIG. 1 is a diagram illustrating an outline of the operation of a vehicle control system having an operation-mode control device of the present embodiment.

FIG. 1 is a diagram illustrating an outline of the operation of the operation-mode control device 12 of the present embodiment. Hereinafter, referring to FIG. 1, an outline of the operation relating to the operation mode control process of the operation mode control device 12 is disclosed herein. Operation mode control device 12 is an example of a vehicle control device.

The vehicle 10 has a user interface (UI) 5, an automatic control device 11, and an operation mode control device 12. Automatic control device 11 controls the operation of the vehicle 10 in response to a plurality of differing operation modes of level to which the driver 40 is contributing to driving. The vehicle 10 may be an autonomous vehicle.

For example, the automatic control device 11 has an automatic operation mode in which the vehicle 10 is driven primarily by the automatic control device 11 (e.g., operation mode of level 3-5), and a manual operation mode in which the vehicle 10 is driven primarily by the driver 40 (e.g., operation mode of level 0-2). The automatic operation mode is an example of the first operation mode and the manual operation mode is an example of the second operation mode.

In the automatic operation mode, the automatic control device 11 uses sensors such as a front camera 2 mounted on the vehicle 10 to generate a driving plan of the vehicle 10 while detecting the environment around the vehicle 10.

When it rains, the raindrops adhere to the front camera 2, there is a possibility that the road features such as represented in the camera image cannot be accurately detected. Thus, the sensor reliability of the front camera 2 decreases. The front camera 2 is an example of the other sensor detecting an environment around the vehicle 10.

Therefore, the operation mode control device 12 estimates an amount of rainfall per unit time based on an acoustic signal acquired by an acoustical sensor 4 mounted on the vehicle 10. In the embodiment shown in FIG. 1, it is raining outside the vehicle 10. The acoustical sensor 4 inputs the sound, etc. caused by the raindrops striking the outer surface of the vehicle 10, and outputs an acoustic signal to the operation mode control device 12.

The operation mode control device 12 determines the operation mode of the vehicle 10 based on the mode information notified from the automatic control device 11. Specifically, the operation mode control device 12 determines whether a present operation mode of the vehicle 10 is the automatic operation mode with a lower level to which the driver 40 is contributing to driving or the manual operation mode with a higher level to which the driver 40 is contributing to driving than the automatic operation mode.

If the present driving mode of the vehicle 10 is the automatic operation mode, there is a possibility that the sensor reliability of the front camera 2 decreases due to the effect of the rain and the automatic control device 11 cannot drive the vehicle 10 safely.

Therefore, the operation mode control device 12 decide a first time T1 until the operation mode of the vehicle 10 is transferred from the automatic operation mode to the manual operation mode based on the amount of rainfall, when the operation mode of the vehicle 10 is the automatic operation mode. The first time T1 may be decided to be less than the time duration between a time when the rain lowers the sensor reliability of the front camera 2 and the vehicle 10 cannot be safely operated, and the current time.

The automatic control device 11 notifies the driver 40 via the UI 5 a control transfer request asking for transferring the operation mode of the vehicle 10 from the automatic operation mode to the manual operation mode, after the first time T1 has elapsed. The driver 40 begins to drive the vehicle 10 after performing an approval operation to approve the control transfer request.

As described above, the operation mode control device 12 can transfer the operation mode of the vehicle 10 to a higher level to which the driver 40 is contributing to driving before the sensor reliability of the front camera 2 decreases by the rain. Thus, the driver 40 can begin the operation of the vehicle 10 in an operation mode with a high level to which the driver 40 is contributing to driving, before the sensor reliability of the front camera 2 decreases, with the automatic control device 11 safely driving the vehicle 10.

Figure 2:
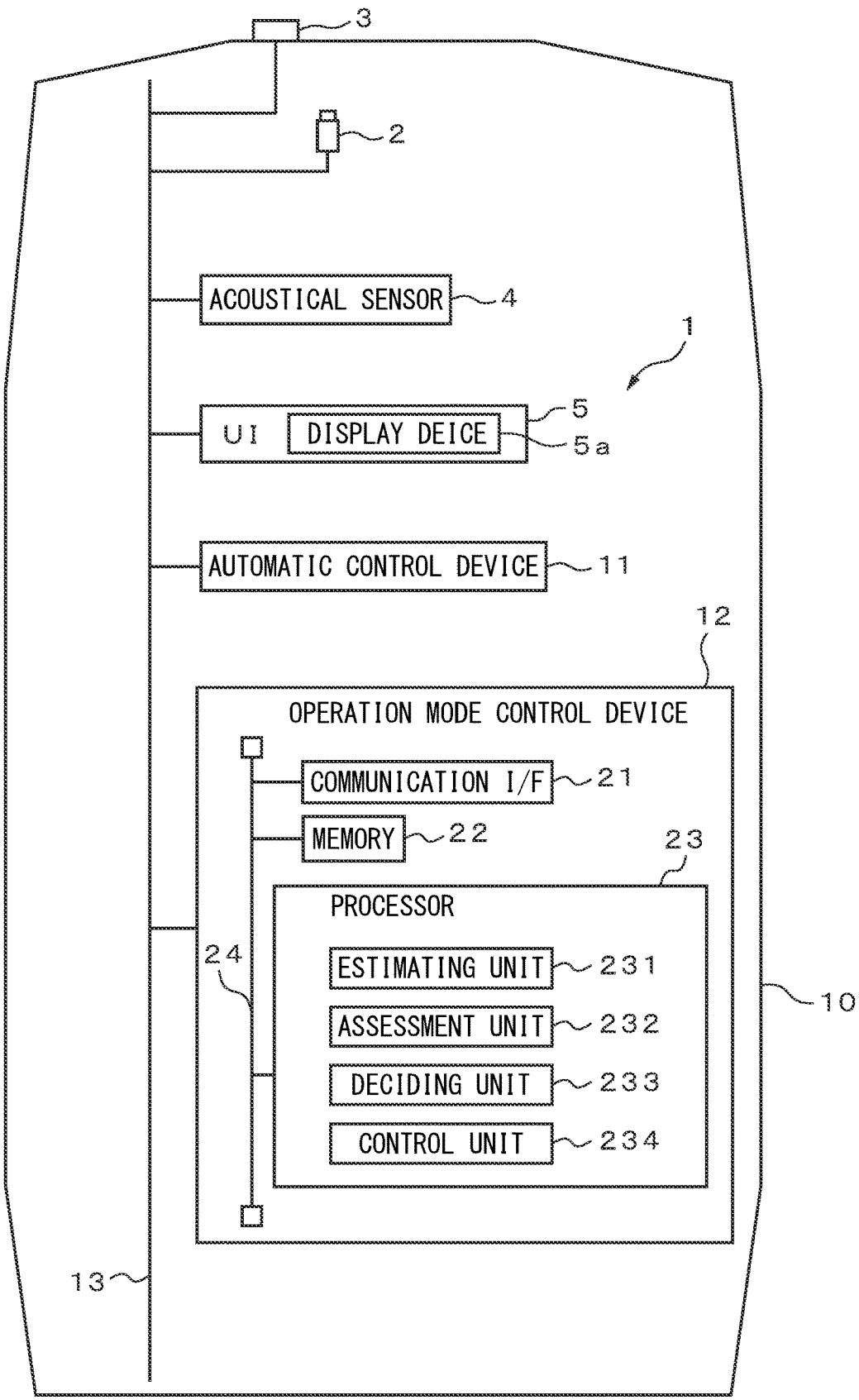
FIG. 2 is a schematic configuration diagram of the vehicle in which the operation mode control device of the present embodiment is mounted.

FIG. 2 is a schematic configuration diagram of the vehicle 10 in which the vehicle control system 1 having the operation mode control device 12 of the present embodiment is mounted. The vehicle control system 1 includes a front camera 2, a LiDAR sensor 3, an acoustical sensor 4, a user interface (UI) 5, an automatic control device 11, an operation mode control device 12, etc.

The front-camera 2, the LiDAR sensor 3, the acoustical sensor 4, the UI 5, the automatic control device 11, and the operation mode control device 12 are communicatively connected through the in-vehicle network 13. The in-vehicle network 13 conforms to controller area network standards.

The front camera 2 is an example of an image sensor provided in the vehicle 10. The front camera 2 is attached to the outer surface of the vehicle 10 so as to face the front of the vehicle 10. The front camera 2 captures a camera image, for example, at a camera image capturing time set in a predetermined cycle. The camera image represents the environment of a predetermined area in front of the vehicle 10. The camera image may represent roads contained within a predetermined area in front of the vehicle 10 and the road features such as lane marking lines on the road surface. The camera image is an example of environmental information representing the surrounding environment of the vehicle 10. The front camera 2 has a two-dimensional detector configured with an array of photoelectric conversion elements sensitive to visible light, such as a CCD or C-MOS, and an imaging optical system for imaging an image of an area to be focused on the two-dimensional detector. Since the front camera 2 is attached to the outer surface of the vehicle 10, the raindrops may adhere to the light receiving part of the front camera 2 (e.g., lens, etc.).

The front camera 2 outputs the camera image and the camera image capturing time to the automatic control device 11, etc. via the in-vehicle network 13 each time the camera image is captured. The camera image is used in the automatic control device 11 to detect other objects around the vehicle 10.

The LiDAR sensor 3 is, for example, attached to the outer surface of the vehicle 10 so as to face the front of the vehicle 10. LiDAR sensor 3 emits the laser so as to scan the front of the vehicle 10 at the reflection wave information acquisition time which is set at a predetermined cycle. The LiDAR sensor 3 receives the reflection wave reflected by the reflective object. The time taken for the reflected wave to return has distance information between other objects located in the direction in which the laser is emitted and the vehicle 10. The LiDAR sensor 3 outputs the reflection wave information together with the reflection wave information acquisition time to the automatic control device 11, etc. via the in-vehicle network 13. The reflection wave information includes the emitted direction of the laser and the time required for the reflected wave to return. The reflection wave information acquisition time is the time when the laser was emitted. The reflection wave information is used in the automatic control device 11 to detect other objects around the vehicle 10. The reflection wave information is an example of environmental information representing the environment around the vehicle 10. Since the LiDAR sensor 3 is mounted on the outer surface of the vehicle 10, the raindrops may adhere to the part of LiDAR sensor 3 that emits and receives the laser.

The acoustical sensor 4 inputs the sounds around the vehicle 10 to generate acoustic signals. The acoustical sensor 4 outputs the acoustic signals to the operation mode control device 12, etc. via the in-vehicle network 13. As the acoustical sensor 4, for example, a microphone can be used. In some embodiments, the acoustical sensor 4 is disposed in the compartment 30 from the viewpoint of protecting the acoustical sensor 4 from the external environment. In the embodiment shown in FIG. 1, the acoustical sensor 4 is located on the ceiling of the compartment 30. The acoustical sensor 4 may inputs the sound of raindrops, etc. that hit the roof of the compartment 30.

The UI 5 is an exemplary notification unit. The UI 5 is controlled by the automatic control device 11 or the operation mode control device 12, etc. to notify the driver 40 of the traveling information related to the vehicle 10. The traveling information related to the vehicle 10 includes travel information of the vehicle 10, a control transfer request, etc. The UI 5 has a display device 5a such as a liquid crystal display or a touch panel to display the traveling information, etc. The UI 5 may also include an acoustical output device (not shown) for notifying the driver 40 of traveling information, etc. The UI 5 also generates operational signal in response to the operation on the vehicle 10 from the driver 40. As the operation information, for example, the destination position, the waypoint, the speed of the vehicle, the approval operation for the control transfer request, and the like. The UI 5 includes, for example, a touch panel or an operation button as an input device for inputting operation information from the driver 40 to the vehicle 10. The UI 5 outputs the operating information to the automatic control device 11 and the operation mode control device 12, etc. via the in-vehicle network 13.

The automatic control device 11 controls the operation including the travel of the vehicle 10. Automatic control device 11 has a plurality of operating modes which differ in level to which the driver 40 is contributing to driving. The automatic control device 11 controls the operation of the vehicle 10 in accordance with the operation mode.

A plurality of operation modes includes the automatic operation mode in which the vehicle 10 is driven primarily by the automatic control device 11 (e.g., operation mode of level 3-5), and a manual operation mode in which the vehicle 10 is driven primarily by the driver 40 (e.g., operation mode of level 0-2). The automatic control device 11 outputs mode information representing the present operation mode of the vehicle 10 to the operation mode control device 12, etc. via the in-vehicle network 13. The automatic operation mode is an example of the first operation mode and the manual operation mode is an example of the second operation mode.

Incidentally, a plurality of operation modes may include a first mode in which a part or all of the driving operation necessary for the travel of the vehicle 10 is executed automatically and a second mode in which the driving operation is executed automatically less than the first mode or no driving operation is executed automatically.

In the automatic operation mode, the automatic control device 11 generates the driving plan that controls operations such as steering, driving, and braking, based on the detection information of the front camera 2 and LiDAR sensor 3, etc. mounted on the vehicle 10. The automatic control device 11 outputs the automatic control signals based on the driving plan to an actuator (not shown) for controlling the steering wheel, a drive device (not shown) or a brake (not shown) via the in-vehicle network 13.

Further, in the manual operation mode, the automatic control device 11 generates manual control signals for controlling the operation of the vehicle 10, such as steering, driving, braking, etc., based on the operation of the driver 40. The automatic control device 11 outputs the manual control signals to the actuator for controlling the steering wheel, drive device or brake via the in-vehicle network 13.

The automatic control device 11 is capable of driving the vehicle 10 in the automatic operation mode in an area where the automatic operation mode is allowed (e.g., an area where a high-precision map for controlling the vehicle 10 is provided).

If the sensor reliability of the front camera 2 or LiDAR sensor 3 decreases, the automatic control device 11 will not be able to accurately detect the environments of the vehicle 10 (e.g., road surface, road features, moving object, etc.). When the sensor reliability of the front camera 2 or LiDAR sensor 3 decreases, the automatic control device 11 notifies the driver 40 of the control transfer request through the UI 5. The control transfer request asks the driver to transfer the operation of the vehicle 10 from the automatic operation mode to the manual operation mode. The driver 40 begins to drive the vehicle 10 after performing an approval operation to approve the control transfer request.

For example, due to the raindrops adhered to the light receiving part of the front camera 2 (e.g., lens, etc.), the camera image becomes blurred. In addition, since the raindrops exist between the front camera 2 and the road features, etc., the road features, etc. represented in the camera image become blurred. When the camera image becomes blurred, it is difficult to detect the road features such as lane marking lines from the camera image. If it continues for a predetermined period that the road features cannot be detected from the camera images, the automatic control device 11 determines that the sensor reliability of the front camera 2 has decreased.

Further, for the LiDAR sensor 3, the raindrops adhere to the part for emitting and receiving the laser, or the emitted laser is scattered by the raindrops. Since the laser is not normally received, the distance between the vehicle 10 and the other object cannot be accurately measured by the LiDAR sensor 3. If it continues for a predetermined period that the distance between the vehicle 10 and the other object cannot be measured accurately, the automatic control device 11 determines that the sensor reliability of the LiDAR sensor 3 has decreased.

When the sensor reliability of the front camera 2 or LiDAR sensor 3 decreases, the automatic control device 12 determines that the driving of the vehicle 10 at the automatic operation mode is not allowed. In this occasion, the automatic control device 11 transfers the driving mode of the vehicle 10 from the automatic operation mode to the manual operation mode. The automatic control device 11 also transfers the operation mode of the vehicle 10 from the automatic operation mode to the manual operation mode or from the manual operation mode to the automatic operation mode as a request from the driver 40.

The operation mode control device 12 carries out estimation processing, assessment processing, deciding processing, and control processing. For these processing, the operation mode control device 12 has a communication interface (IF) 21, a memory 22, and a processor 23. The communication interface 21, the memory 22, and the processor 23 are connected via a signal wire 24. The communication interface 21 has an interface circuit for connecting the operation mode control device 12 to the in-vehicle network 13.

The memory 22 is an example of a storage unit, and it has a volatile semiconductor memory and a non-volatile semiconductor memory, for example. The memory 22 stores application computer programs and various data to be used for information processing carried out by the processor 23.

All or some of the functions of the operation mode control device 12 are, for example, functional modules implemented by computer programs operating on the processor 23. The processor 23 includes an estimating unit 231, an assessment unit 232, a deciding unit 233, and a control unit 234. Processor 23 includes one or more CPUs (Central Processing Units) and their peripheral circuits. The processor 23 may also have other computing circuits such as a logical operation unit, numerical calculation unit or graphic processing unit. Alternatively, the functional module of the processor 23 may be a dedicated computing circuit provided in the processor 23. The operation of the operation mode control device 12 will be described later.

The automatic control device 11 and the operation mode control device 12, for example, are electronic control units (Electronic Control Unit: ECU). In FIG. 2, the automatic control device 11 and the operation mode control device 12 are described as separate devices, but all of these devices may be configured as a single device.

Figure 3:
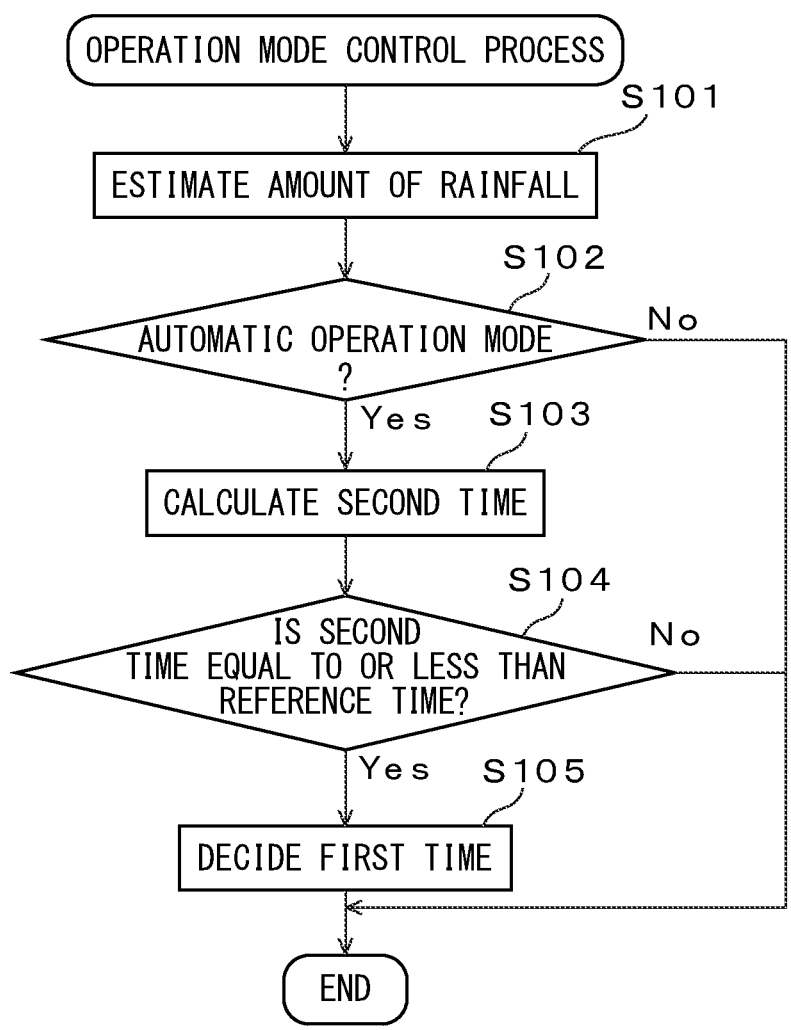
FIG. 3 is an exemplary operation flow chart relating to the operation mode control process of the operation mode control device of the present embodiment.

FIG. 3 is an exemplary operation flow chart relating to the operation mode control process of the operation mode control device 12 of the present embodiment. Referring to FIG. 3, the operation mode control process of the operation mode control device 12 will be described below. The operation mode control device 12 executes the operation mode control process in accordance with the operation flow chart shown in FIG. 3 at an operation mode control time having a predetermined cycle. The cycle in which the operation mode control process is executed can be 1 second to 10 seconds, for example.

First, the estimating unit 231 estimates an amount of rainfall per unit time based on the acoustic signal acquired by the acoustical sensor 4 (step S101). The amount of rainfall per unit time (e.g., 1 hour) is expressed in depth of the fallen rain (e.g., mm), for example. The estimating unit 231 has a classifier trained to output the amount of rainfall per unit time by inputting the acoustic signal. As the classifier, for example, a deep neural network (DNN) that is trained to detect the amount of rainfall per unit time from the input acoustic signal can be used. As for the training data of this classifier, data which is labeled the amount of rainfall for the thunderstorm and raindrop sounds may be used. This makes it possible to estimate precisely the amount of rainfall during a thunderstorm.

Next, the assessment unit 232 determines whether the present operation mode of the vehicle 10 is the automatic operation mode or the manual operation mode based on the mode information representing the operation mode of the vehicle 10 (step S102). The automatic operation mode is an operation mode with a lower level to which the driver 40 is contributing to driving. The manual operation mode is an operation mode with a higher level to which the driver 40 is contributing to driving than the automatic operation mode. The assessment unit 232 determines that the present operation mode of the vehicle 10 is the automatic operation mode when the mode information representing the operation mode of the vehicle 10 represents the automatic operation mode. Further, the assessment unit 232 determines that the present operation mode of the vehicle 10 is the manual operation mode when the mode information representing the operation mode of the vehicle 10 represents the manual operation mode. If the present operation mode of the vehicle 10 is not the automatic operation mode (step S102—No), the series of processes is complete.

If the present operation mode of the vehicle 10 is the automatic operation mode (step S102—Yes), the deciding unit 233 calculates a second time T2 until the sensor reliability is equal to or less than a predetermined reference reliability, based on the amount of rainfall (step S103). This sensor reliability represents the reliability of detecting the environment around the vehicle 10 by the other sensor that detects the environment around the vehicle 10. The front-camera 2 and LiDAR sensor 3 are examples of the other sensors that detect the environment around the vehicle 10.

The detailed processing of a time calculation process of the second time T2 calculated by the deciding unit 233 will be described later.

Next, the deciding unit 233 decides whether the second time T2 is equal to or less than a reference time (step S104). If the second time T2 is relatively long (e.g., 60 minutes), there is some grace until the reliability decrease point where the sensor reliability is below the predetermined reference reliability. In this case, the need to immediately notify the driver 40 of the control transfer request is low. In some embodiments, the control transfer request is notified to the driver 40 when the duration from the current time point to the reliability decrease point becomes somewhat shorter. The reference time may be, for example, 5 minutes to 10 minutes. If the second time T2 is not equal to or less than the reference time (step S104—No), the series of processes is complete. In some embodiments, the cycle of the operation mode control process is executed shorter than the reference time.

On the other hand, if the second time T2 is equal to or less than the reference time (step S104—Yes), the deciding unit 233 decides the first time T1 based on the second time T2 (step S105) and the series of processes is complete.

The deciding unit 233 may decide the first time T1 to be shorter than the second time by at least a minimum transfer time (e.g., 4 seconds to 10 seconds). This minimum transfer time is the time it takes for the driver 40 to approve the vehicle 10 from the automatic operation mode to the manual operation mode. This allows the driver 40 to operate UI 5 to ensure that the control transfer request is acknowledged. Further, this ensures that transferring the operation mode of the vehicle 10 from the automatic operation mode to the manual operation mode before the sensor reliability of the front camera 2 and LiDAR sensor 3 decreases.

Further, the deciding unit 233 may decide the first time T1 to be shorter than the second time T2 by a time obtained by adding a predetermined addition time to the minimum transfer time. The addition time may be a fixed time, or a time corresponding to the speed of the vehicle 10. For example, the addition time may be longer as the speed of the vehicle 10 is faster.

The control unit 234 notifies the driver via the UI 5 that it is planned to transfer the operation mode of the vehicle 10 from the automatic operation mode to the manual operation mode after the first time T1 has elapsed. Thus, it is possible for the driver to know in advance that the control transfer request will be notified after the elapse of the first hour T1. The control unit 234 is an example of the notification control unit.

The deciding unit 233 outputs an information requesting to transfer the operation mode of the vehicle 10 from the automatic operation mode to the manual operation mode, via the in-vehicle network 13, to the automatic control device 11 after the first time T1 has elapsed from the present time.

After the first hour T1 has elapsed, the automatic control device 11 notifies the driver 40 of the control transfer request asking for transferring the operation of the vehicle 10 from the automatic operation mode to the manual operation mode via UI 5. The driver 40 begins the operation of the vehicle 10 after performing the approval operation to approve the control transfer request.

Figure 4:
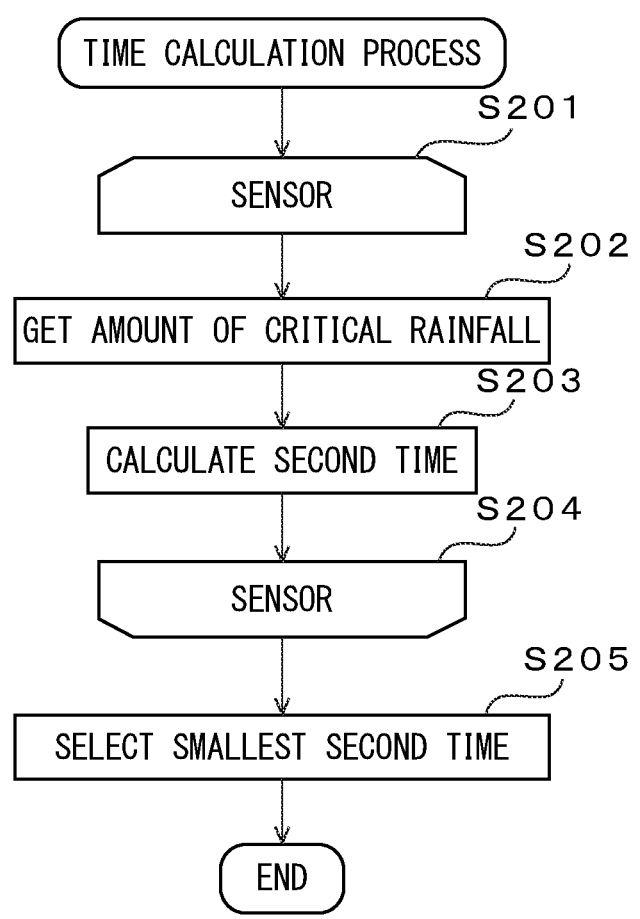
FIG. 4 is an exemplary operation flow chart relating to the time calculation process of the operation mode control device of the present embodiment.

Next, the time calculation process of the second time T2 calculated by the deciding unit 233 will be described below referring to FIG. 4. FIG. 4 is an exemplary operation flow chart relating to the time calculation process of the operation mode control device 12 of the present embodiment.

In the operational flow chart shown in FIG. 4, between the step S201 and step S204, the processes of the step S202 and step S203 are carried out for each of the sensors that detect the environments around of the vehicle 10. In the present embodiment, the front camera 2 and LiDAR sensor 3 are exemplified as the sensors.

First, the deciding unit 233 gets an amount of critical rainfall that the sensor reliability of detecting the environment around the vehicle 10 by the sensor becomes equal to or less than the predetermined reference reliability (step S202).

Figure 5:
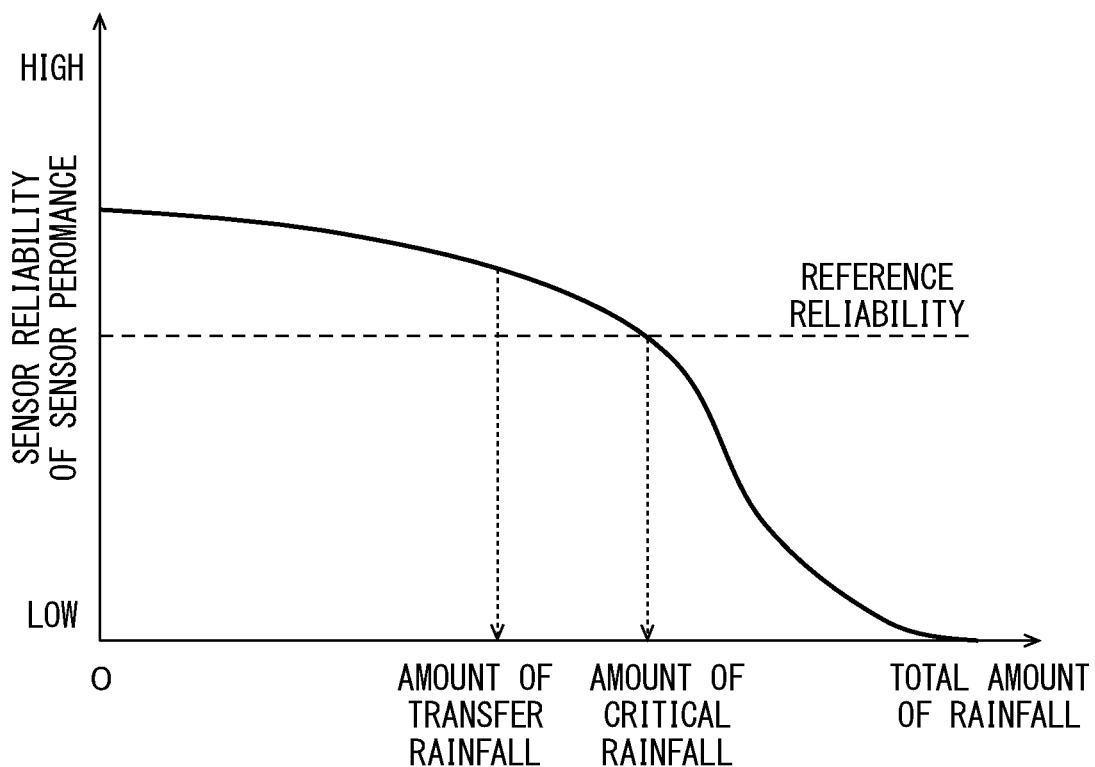
FIG. 5 is a diagram illustrating an exemplary relation between the sensor performance and the total amount of rainfall.

FIG. 5 is a diagram illustrating an exemplary relation between the sensor performance and the total amount of rainfall. The vertical axis of FIG. 5 represents the sensor reliability of the sensor performance for detecting the environment around the vehicle 10. The horizontal axis of FIG. 5 represents the total amount of rainfall representing the total amount of rain received by the sensor mounted on the vehicle 10. The total amount of rainfall is the amount of rain that the sensor has continued to receive the rain during a predetermined period of time from the current time. Specifically, the total amount of rainfall is determined by the product of the present amount of rainfall and the time the sensor continued to receive the rain. The sensor performance decreases with increasing the total amount of rainfall.

FIG. 5 shows the reference reliability of the sensor performance. When the sensor reliability of the sensor performance is above this reference reliability, the automatic control device 11 can use the sensor to generate a safe driving plan for the vehicle 10 while detecting the environment around the vehicle 10. The relation between the sensor performance and total amount of rainfall for each sensor, as shown in FIG. 5, for example, is stored in the memories 22 together with the reference reliability. The deciding unit 233 gets the amount of critical rainfall corresponding to the reference reliability defined for each sensor by referring to the relation shown in FIG. 5.

When the sensor is the front camera 2, a reliability output from a classifier which indicates that the camera images include the road features may be used as for the sensor reliability of the sensor performance, in which the classifier is trained to detect the road features from the camera images.

The relation between the sensor performance and the total amount of rainfall shown in FIG. 5 can be obtained by inputting the camera images including the road features into the classifier while the camera images are taken exposing the front camera 2 to the rain and examining the relation between the reliability indicating that the camera images include the road features and the total amount of rainfall. For example, the total amount of rainfall where the reliability indicating that the camera images include the road features is below the reference reliability, is obtained as the amount of critical rainfall.

Further, when the sensor is LiDAR sensor 3, the accuracy of the distance between the vehicle 10 and the other object determined by the reflection wave information is used as a sensor reliability of the sensor performance.

The relationship between the sensor performance and the total amount of rainfall shown in FIG. 5 is obtained by examining the relationship between the accuracy of the distance between the vehicle 10 and the other object and the total amount of rainfall. The accuracy of the distance is determined by the reflection wave information reflected from the other object while the LiDAR sensor 3 is exposed to the rain. For example, the total amount of rainfall where the accuracy of the distance is less than the reference accuracy is obtained as the amount of critical rainfall.

Next, the deciding unit 233 calculates the second time T2 based on the amount of critical rainfall and the amount of rainfall per unit time (step S203). The deciding unit 233 calculates the second time T2 using the following equation (1).

$$T2=Y/(S\times X) \quad (1)$$

Here, Y is the amount of critical rainfall, S is the area of the detecting portion exposed to the outside of the sensor, X is the amount of rainfall per unit time (estimated by step S101). If the sensor is the front camera 2, S represents the area of the light receiving part of the front camera 2 (e.g., a lens). If the sensor is the LiDAR sensor 3, S is the area of the part that emits and receives the laser. The area S is stored in the memory 22.

After the second time T2 is calculated for each of the sensors, the deciding unit 233 selects the smallest second time (step S205) and the series of processes is complete. The deciding unit 233 selects the smallest time among the second time for the front camera 2 and the second time for LiDAR sensor 3 as the second time T2.

In the process described above, the deciding unit 233 may decide the second time T2 based on the amount of rainfall and the speed of the vehicle 10. If the speed of the vehicle 10 is fast, the area where the raindrops contact the detector of the sensor is substantially increased. The faster the speed of the vehicle 10, the shorter the second time T2.

When the speed of the vehicle 10 is taken as Vv and the falling speed of the raindrop is taken as Vr, the degree of A1 that the raindrop adheres to the surface of the sensor is expressed by the following equation (2).

$$A1=Vv/Vr \quad (2)$$

Here, a typical falling speed of the raindrop may be used as the falling speed Vr of the raindrop. The typical falling speed Vr is stored in the memory 22. The speed Vv of the vehicle 10 is detected by a vehicle speed sensor (not shown). A1 increases with increasing of the speed Vv of the vehicle 10.

In this instance, the second time T2 is expressed by the following equation (3).

$$T2=B1\times F1(A1)\times Y/(S\times X) \quad (3)$$

Here, B1 is a predetermined factor. F1(A1) is a functional of the correction value A1 and decreases with increasing of the correction value A1. For example, F1(A1) may be a function obtaining an inverse of a A1.

Further, the deciding unit 233 may calculate the second time T2 based on the amount of rainfall and a direction of the detection part of the sensor when calculating the second time T2. When the sensor is the front camera 2, the direction of the detection part of the sensor represents an orientation perpendicular to the plane of the light receiving part of the front camera 2. When the sensor is the LiDAR sensor 3, the direction of the detecting part of the sensor represents an orientation perpendicular to a part that emits and receives the laser.

The amount of raindrops adhering to the surface of the sensor varies depending on the direction of the detection part of the sensor. If the direction of the detection part of the sensor is a vertical direction facing upward, the amount of raindrops adhering to the detection part of the sensor is large. On the other hand, when the direction of the detection part of the sensor is a direction perpendicular to the vertical direction, the amount of raindrops adhering to the detection part of the sensor is small.

Here, when the direction of the detecting part of the sensor with respect to the vertical direction facing upward is expressed by $\theta$ (0 to 90 degrees), the degree of A2 that raindrops adhere to the surface of the sensor is expressed by the following equation (4).

$$A2=F2(\theta) \quad (4)$$

Here, F2 ($\theta$) is a functional of $\theta$ and reduces with the increasing of $\theta$. As F2 ($\theta$), for example, a cosine function may be used.

In this instance, the second time T2 is expressed by the following equation (5). Here, B2 is a predetermined factor.

$$T2=B2\times F2(\theta)\times Y/(S\times X) \quad (5)$$

Furthermore, the second temporal T2 may be determined based on the amount of rainfall, the direction of the detecting part of the sensor and the speed of the vehicle 10.

As described above, the operation mode control device can transfer the operation mode of the vehicle to a higher level to which the driver is contributing to driving, before the sensor reliability of the sensor for generating the driving plan of the vehicle by rain is lowered. Thus, the driver can begin the operation of the vehicle in an operation mode with a high level to which the driver is contributing to driving, before the sensor reliability of the sensor decreases.

In the present disclosure, the vehicle control device, the computer program for vehicle control and the method for controlling a vehicle according to the embodiment described above may incorporate appropriate modifications that are still within the gist of the disclosure. Moreover, the technical scope of the disclosure is not limited to these embodiments, and includes the present disclosure and its equivalents as laid out in the claims.

Figure 6:
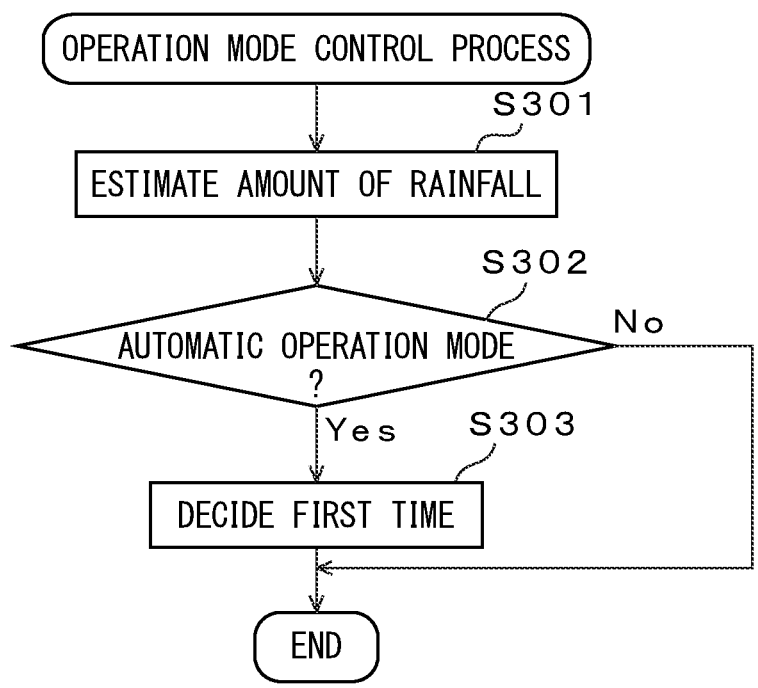
FIG. 6 is an exemplary operation flow chart relating to another operation mode control process of the operation mode control device of the present embodiment.

For example, in the present disclosure, the first time may be decided without calculating the second time, based on the amount of rainfall. FIG. 6 is an exemplary operation flow chart relating to another operation mode control process of the operation mode control device of the present embodiment.

In the operation flow chart shown in FIG. 6, the processes of step S301 and step S302 are similar to the processes of step S101 and step S102 described above.

If the present operation mode of the vehicle 10 is the automatic operation mode (step S302—Yes), the deciding unit decides the first time T1 based on the amount of transfer rainfall and the amount of rainfall (step S303), and the series of processes is complete.

The deciding unit decides the first time T1 using the following equation (6).

$$T1=Z/(S\times X) \quad (6)$$

Here, Z is the amount of transfer rainfall, S is the area of the detecting part of the sensor exposed to the outside, X is the amount of rainfall per unit time (estimated by step S301).

The amount of transfer rainfall can be determined using the relation between the sensor reliability of the sensor performance and the total amount of rainfall shown in FIG. 5. First, the deciding unit gets the amount of critical rainfall based on the relation between the sensor reliability of the sensor performance and the total amount of rainfall shown in FIG. 5. The deciding unit then determines the amount of transfer rainfall, which is less than the amount of critical rainfall, based on the amount of critical rainfall. For example, the deciding unit determines the amount of transfer rainfall by the product of the critical rainfall and a predetermined factor (a positive real number less than 1, for example, 0.8).

Further, the deciding unit may decide the first time as zero if the amount of rainfall is greater than zero, the operation mode of the vehicle may be immediately transferred from the first operation mode to the second operation mode.

The invention claimed is:

1. A vehicle control device comprising:
a processor configured to:
estimate an amount of rainfall per unit time based on an acoustic signal acquired by an acoustical sensor mounted on a vehicle,
determine whether a present operation mode of the vehicle is a first operation mode with a lower level to which a driver is contributing to driving or a second operation mode with a higher level to which the driver is contributing to driving than the first operation mode,
decide a first time until the operation mode of the vehicle is transferred from the first operation mode to the second operation mode based on the amount of rainfall, when the operation mode of the vehicle is the first operation mode,
calculate a second time until reliability of detecting an environment around the vehicle by another sensor detecting the environment around the vehicle becomes equal to or less than a predetermined reference reliability based on the amount of rainfall, and decide the first time to be shorter than the second time,
execute an operational mode control process including transferring operation mode from the first operation mode to the second operation mode at an operation mode control time having a predetermined cycle and prior to a reliability of the acoustical sensor or the another sensor being lowered, and
notify, via a user interface, a driver of the transfer of the operation mode of the vehicle from the first operation mode to a second operation mode in response to a lapse of the first time, wherein
the another sensor is configured to generate a driving plan of the vehicle, and
the vehicle is configured to autonomously travel in accordance with the driving plan of the vehicle.

2. The vehicle control device according to claim 1, wherein the processor is further configured to calculate the second time based on the amount of rainfall and speed of the vehicle.

3. The vehicle control device according to claim 1, wherein the processor is further configured to calculate the second time based on the amount of rainfall and a direction of the another sensor.

4. The vehicle control device according to claim 1, wherein the processor is further configured to decide the first time so that at least time required for the driver to approve a transfer of the operation mode of the vehicle from the first operation mode to the second operation mode is shorter than the second time.

5. A computer-readable, non-transitory storage medium storing a computer program for vehicle control, which causes a processor to execute a process, and the process comprising:
estimating an amount of rainfall per unit time based on an acoustic signal acquired by an acoustical sensor mounted on a vehicle;
determining whether a present operation mode of the vehicle is a first operation mode with a lower level to which a driver is contributing to driving or a second operation mode with a higher level to which the driver is contributing to driving than the first operation mode;
deciding a first time until the operation mode of the vehicle is transferred from the first operation mode to the second operation mode based on the amount of rainfall, when the operation mode of the vehicle is the first operation mode;
calculating a second time until reliability of detecting an environment around the vehicle by another sensor detecting the environment around the vehicle becomes equal to or less than a predetermined reference reliability based on the amount of rainfall, and decide the first time to be shorter than the second time;
executing an operational mode control process including transferring operation mode from the first operation mode to the second operation mode at an operation mode control time having a predetermined cycle and prior to a reliability of the acoustical sensor or the another sensor being lowered; and
notifying, via a user interface, a driver of the transfer of the operation mode of the vehicle from the first operation mode to a second operation mode in response to a lapse of the first time, wherein
the another sensor is configured to generate a driving plan of the vehicle, and
the vehicle is configured to autonomously travel in accordance with the driving plan of the vehicle.

6. A method for controlling a vehicle carried out by a vehicle control device, and the method comprising:
estimating an amount of rainfall per unit time based on an acoustic signal acquired by an acoustical sensor mounted on a vehicle;
determining whether a present operation mode of the vehicle is a first operation mode with a lower level to which a driver is contributing to driving or a second operation mode with a higher level to which the driver is contributing to driving than the first operation mode;
deciding a first time until the operation mode of the vehicle is transferred from the first operation mode to the second operation mode based on the amount of rainfall, when the operation mode of the vehicle is the first operation mode;
calculating a second time until reliability of detecting an environment around the vehicle by another sensor detecting the environment around the vehicle becomes equal to or less than a predetermined reference reliability based on the amount of rainfall, and decide the first time to be shorter than the second time;
executing an operational mode control process including transferring operation mode from the first operation mode to the second operation mode at an operation mode control time having a predetermined cycle and prior to a reliability of the acoustical sensor or the another sensor being lowered; and
notifying, via a user interface, a driver of the transfer of the operation mode of the vehicle from the first operation mode to a second operation mode in response to a lapse of the first time, wherein
the another sensor is configured to generate a driving plan of the vehicle, and
the vehicle is configured to autonomously travel in accordance with the driving plan of the vehicle.

* * * * *